United States Patent [19]
Katoh

[11] Patent Number: 6,085,264
[45] Date of Patent: *Jul. 4, 2000

[54] ACCOUNTING-INFORMATION OUTPUTTING DEVICE

[75] Inventor: Shinichi Katoh, Nagoya, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/946,852

[22] Filed: Oct. 8, 1997

[30] Foreign Application Priority Data

Mar. 28, 1997 [JP] Japan ................................. 9-077920

[51] Int. Cl.$^7$ ........................................... G06F 13/00
[52] U.S. Cl. ............................................. 710/59; 705/30
[58] Field of Search ........................... 707/517, 505–507; 398/640, 114; 400/618.2; 705/30–45; 710/15–19, 58–64, 72–74

[56] References Cited

U.S. PATENT DOCUMENTS

| | | | |
|---|---|---|---|
| 4,774,655 | 9/1988 | Kollin et al. ................................. | 707/4 |
| 5,325,303 | 6/1994 | Walz et al. ............................... | 705/404 |
| 5,504,677 | 4/1996 | Pollin ........................................ | 705/45 |
| 5,563,714 | 10/1996 | Inoue et al. ............................... | 386/66 |
| 5,584,591 | 12/1996 | Mori et al. ............................ | 400/615.2 |
| 5,630,029 | 5/1997 | Kosukegawa ............................ | 395/114 |
| 5,640,556 | 6/1997 | Tamura ..................................... | 395/610 |
| 5,751,923 | 5/1998 | Matsuzawa ............................... | 395/114 |
| 5,828,845 | 10/1998 | Jagadish et al. .................... | 395/200.59 |
| 5,845,302 | 12/1998 | Cyman, Jr. et al. ..................... | 707/517 |
| 5,862,223 | 1/1999 | Walker et al. ............................. | 380/25 |
| 5,889,860 | 3/1999 | Eller et al. ................................. | 380/4 |
| 5,966,698 | 10/1999 | Pollin ........................................ | 705/45 |

FOREIGN PATENT DOCUMENTS 2 210 482  6/1989  United Kingdom .

OTHER PUBLICATIONS

"AIX Version 3.2 —System Management Guide: Operating System and Devices", Oct. 1993, International Business Machines Corp., US XP002067192, Chapter 14: "System Accounting".

"Conditional Line Execution Process" IBM Technical Disclosure Bulletin, vol. 37, No. 6A, Jun. 1, 1994, pp. 549–550 XP000455878.

*Primary Examiner*—Christopher B. Shin
*Attorney, Agent, or Firm*—Staas & Halsey, LLP

[57] ABSTRACT

An accounting-process-type setting program is executed and thereby an accounting-record outputting condition is set. Then, when execution of an execution unit is finished, an accounting-record outputting program is executed, and thereby, it is determined whether or not the accounting-record outputting condition set by the execution of the accounting-process-type setting program is fulfilled, and, only when this condition is fulfilled, an accounting record is output.

14 Claims, 5 Drawing Sheets

ACCOUNTING-INFORMATION OUTPUTTING DEVICE

BACKGROUND OF THE INVENTION

1. Field of the Invention

The present invention relates to outputting an accounting record for each execution unit when a computer system executes a program.

2. Description of the Related Art

When a program of a large calculation amount is executed, a computer system which is specialized in high-speed calculation is used. A case where such a computer system is used by only a single user is rare, and, ordinarily, such a computer system is shared between a plurality of users. In accordance with CPU time used for a program and an I/O amount, fee is charged for each user.

A program is executed in execution units, called processes, under an operating system program. When a program is executed, processes are generated, are loaded in memory spaces allocated for the processes, respectively, and are executed. In response to the execution of the program, CPU time used, an I/O amount and so forth are managed and updated as accounting information for each process. When the execution of the program is finished, the processes are deleted. At this time, the accounting information is output to an accounting file as an accounting record.

When a plurality of programs, related to each other, are executed, a plurality of processes for executing the programs can be managed as one job. Further, users' programs are executed as jobs.

In a computer system in the related art, a program executed for system management and a program executed by a user are not distinguished from one another, and, after completion of processes, the accounting record is output to the accounting file.

When a power supply to a computer system is started, when a system is restarted, or the like, many programs are executed for various initializing settings and so forth. Therefore, generation and deletion of processes are repeated many times.

Outputting of the accounting record to the accounting file is a process which requires considerable time because accessing an external storage device accompanies the processing. Accordingly, there is a problem that when a power supply to a computer system is started or when a system is restarted, a long time is required before execution of a user's program is started.

SUMMARY OF THE INVENTION

An object of the present invention is to reduce a time required before execution of a user's program when a computer system is started.

In the present invention, when processes are finished, it is determined whether or not a condition for outputting an accounting record is fulfilled. Then, only when the condition is fulfilled, the accounting record is output. Thereby, unnecessary accounting-record outputting is eliminated. Thereby, the above-mentioned object is achieved.

In the present invention, control is performed so that the accounting record is output only when the previously set condition is fulfilled. Accordingly, the accounting-record outputting processing for a process for which it is not necessary to output the accounting record can be eliminated. Thus, a time required for the processing can be reduced, and also, it is possible to reduce a time required until execution of a program of a user is started.

Further, because the size of the accounting file becomes small, the area necessary for storing the accounting file can be reduced, and a processing time required for performing totalization processing using the accounting file as the input can be reduced.

Other objects and further features of the present invention will become more apparent from the following detailed description when read in conjunction with the accompanying drawings.

DETAILED DESCRIPTION OF THE PREFERRED EMBODIMENT

Figure 1:
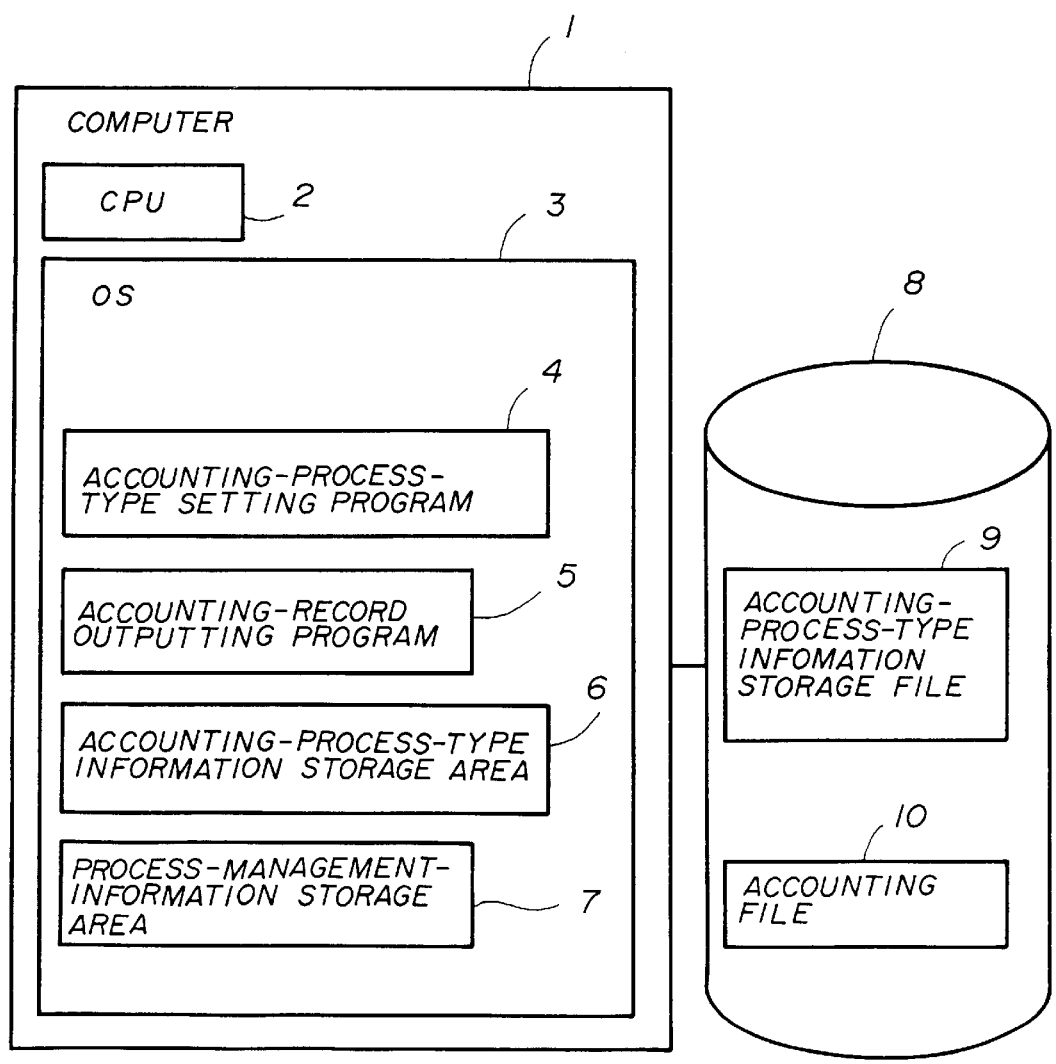
FIG. 1 shows an arrangement of one embodiment of the present invention.

FIG. 1 shows an embodiment of the present invention.

A computer 1 includes a CPU 2, an operation system (OS) 3, an accounting-process-type setting program 4, an accounting-record outputting program 5, an accounting-process-type information storage area 6 and a process-management-information storage area 7. In an external storage device 8, an accounting-process-type storage file 9 and an accounting file 10 are stored.

Figure 2:
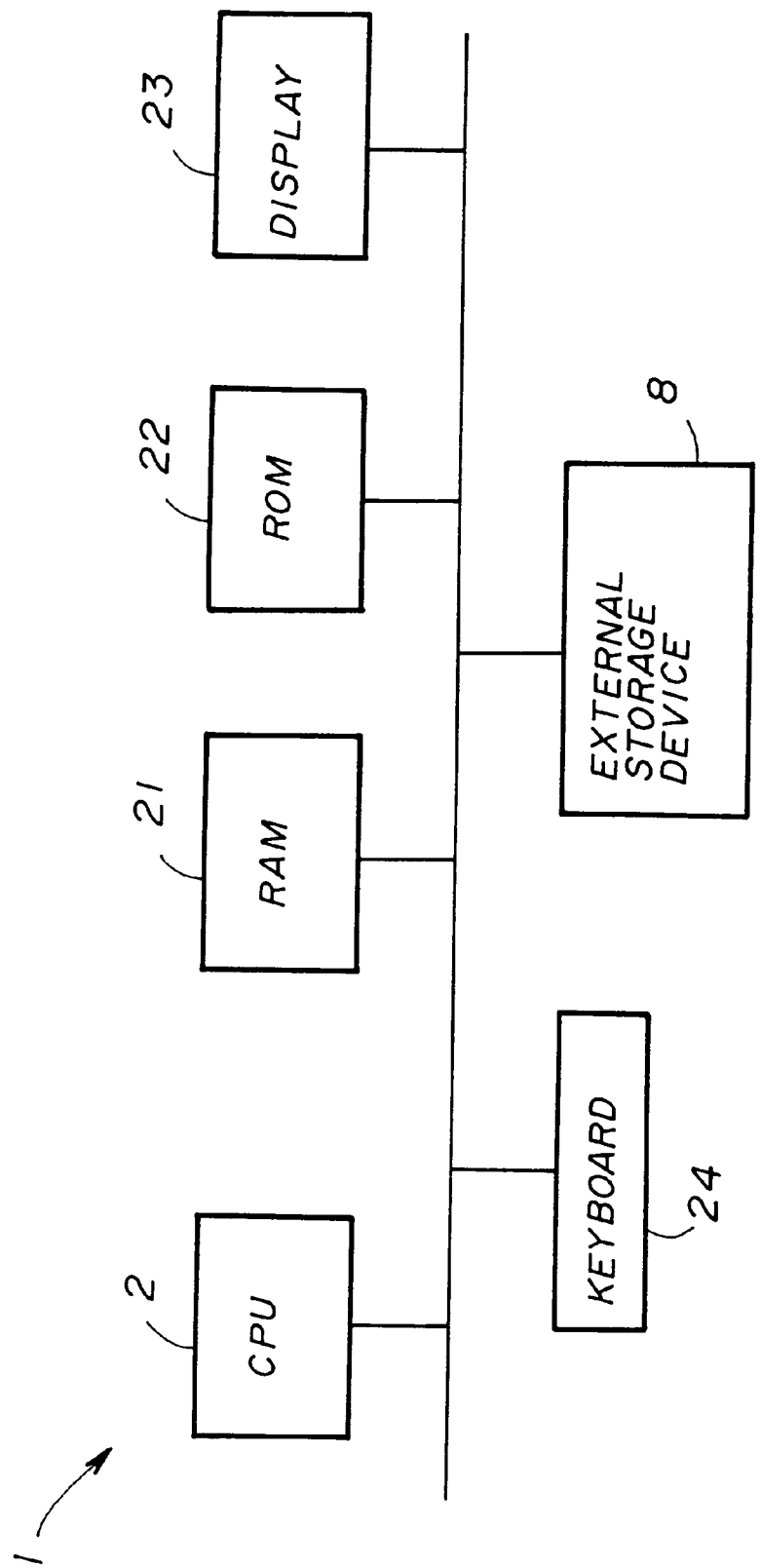
FIG. 2 shows a block diagram of an example of the embodiment of the present invention.

FIG. 2 shows a block diagram of an example of the embodiment of the present invention.

The CPU 2 executes various programs. A ROM 22 stores various programs. A RAM 21 stores various programs as a result of the various programs being loaded in the RAM 21 from the ROM 22 or from the external storage device 8. A display 23 is used for displaying an image in accordance with instructions from the CPU 2. A keyboard 24 is used for inputting various information to the computer 1. The external storage device 8 may store various programs and/or data other than the accounting-process-type storage file 9 and the accounting file 10.

The operation system 3 is a program which controls execution of a user's program which is executed in the computer 1, is present in a memory such as the RAM 21 shown in FIG. 2, and is executed by the CPU 2.

The accounting-process-type setting program 4 and the accounting-record outputting program 5 are present in the memory in the computer 1 and are executed by the CPU 2 under the operation system 3.

The accounting-record outputting program 5 is a program which outputs accounting information concerning a process to the accounting file 10 as an accounting record when the process has been finished.

The accounting-process-type information storage area 6 is an area in the memory for storing the description contents, concerning accounting process types, which are described in the accounting-process-type information storage file 9.

The accounting-process-type information storage file 9 is a file for storing information which specifies processes to be charged a fee. When the accounting records are output for all processes, "PROCTYPE=AP_ALL" is described in this file. When the accounting records are output only for job processes, "PROCTYPE=AP_JOB" is described in this file. When the accounting records are output for processes, other than the job processes, such as TSS (Time Sharing System) processes, "PROCTYPE=AP_NJOB" is described in this file.

In accordance with the accounting-type-setting program 4, the contents of the accounting-process-type storage file 9 are read, when the system is started, and are stored in the accounting-process-type information storage area 6, which is a predetermined area of the memory. This process is indicated by a step S1 of FIG. 3.

Figure 3:
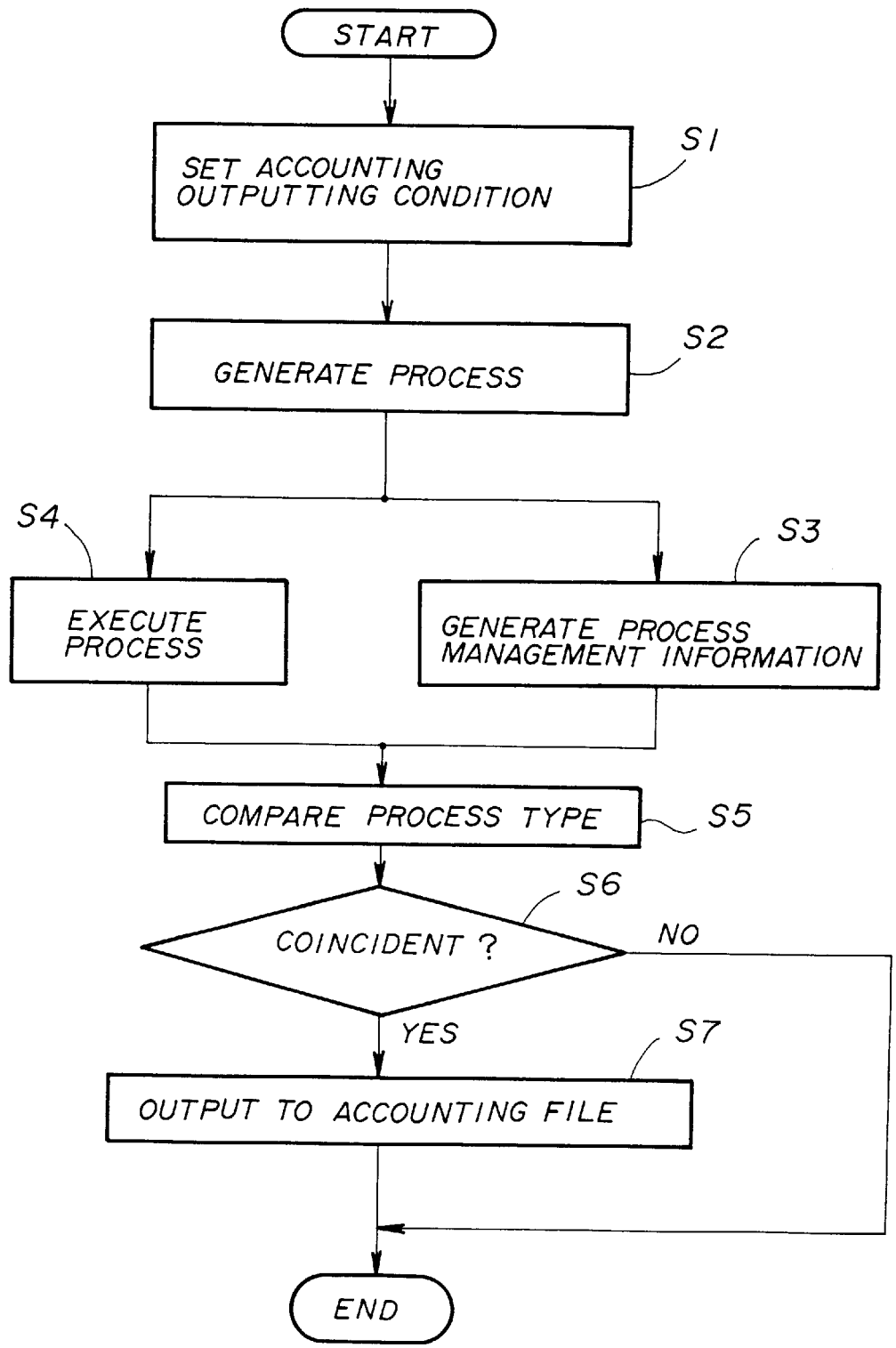
FIG. 3 shows a flow of processing of an accounting-process-type setting program, process generating processing, process-management-information generating processing and processing of an accounting-record outputting program.

A new process is generated, in a step S2 of FIG. 3, either by process generation based on a process generating request or by process generation based on a job starting request.

Figure 4:
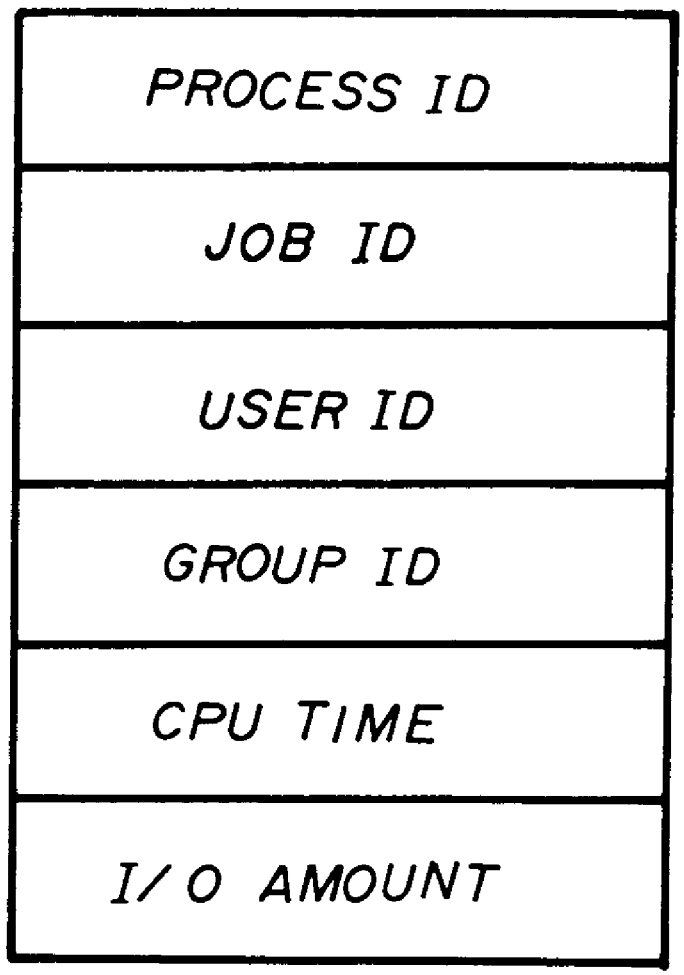
FIG. 4 shows an arrangement of process management information.

In each case, when a new process is generated, process management information concerning the process is generated, in a step S3 of FIG. 3, and is stored in the process-management-information storage area 7 which is a predetermined portion of the memory. One example of an arrangement of the process management information is shown in FIG. 4.

A process ID is an ID which uniquely identifies a process. A job ID is an ID which uniquely identifies the job to which the process belongs. A user ID is an ID which uniquely identifies a user who has performed the process. A group ID is an ID which uniquely identifies the group to which the user belongs.

When a process has been generated based on the job starting request, the job ID is the job ID of the job to which the process belongs. However, when a process is generated based on the process generation request, a special value '−1', which indicates that the process is not the job process, is set as the job ID.

CPU time is a cumulative time which has elapsed for the CPU to execute a program from the time when the process was generated to the present time.

An I/O amount indicates a cumulative value of an amount of data which has been input and output by the program from the time when the process was generated to the present time.

The CPU time and I/O amount are dynamically updated by the operation system 3.

The process is executed, in a step S4 in FIG. 3, and, when the execution of the process is finished, the accounting-record outputting program 5 is executed.

In steps S5 and S6 of FIG. 3, in accordance with the accounting-record outputting program 5, it is determined whether or not the process is a process for which the accounting record should be output. In a case where AP_ALL has been set in the accounting-process-type information storage area 6 (PROCTYPE=AP_ALL), a case where AP_JOB has been set and the job ID (stored in the process-management-information storage area 7) is not 0 (PROCTYPE=AP_JOB & JOB ID=−1) and a case where AP_NJOB has been set and the job ID is 0 (PROCTYPE=AP_NJOB & JOB ID=0), a condition is fulfilled. Only when the condition has been fulfilled, in a step S7 of FIG. 3, the contents of the process management information are added at the last of the contents of the accounting file 10 of the external storage device 8.

In the above-described embodiment, determination as to whether or not the accounting record is output is performed based on whether the type of the process is the job process or the TSS process. However, as the condition of outputting the accounting record, whether the user ID is a special user ID, whether the group ID is a special group ID, whether the CPU time or the I/O amount is more than a predetermined amount and/or the like can be used. Further, the process management information which is used as the basis is not limited to the process management information shown in FIG. 3.

Figure 5:
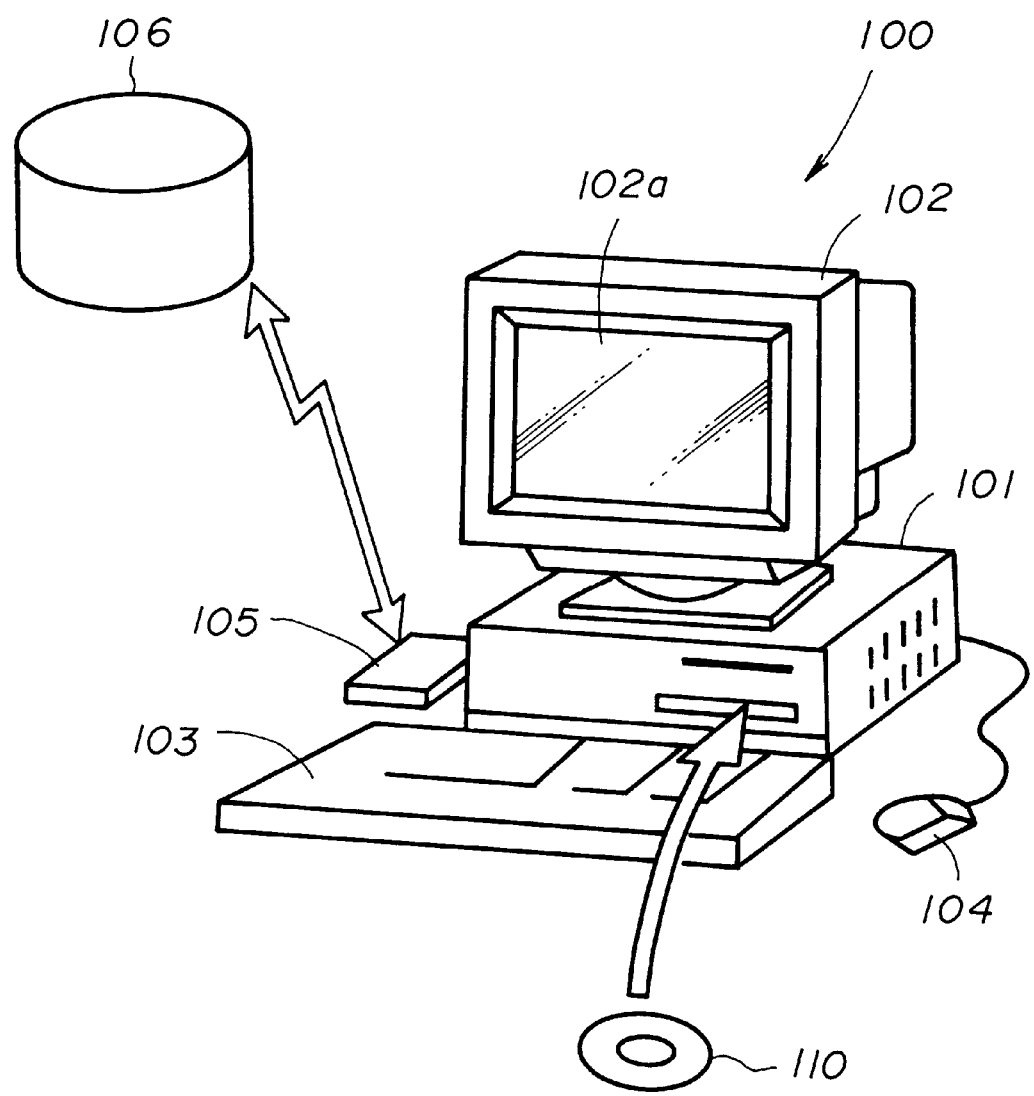
FIG. 5 shows a computer system by which the present invention can be practiced.

Further, the present invention can be practiced using a general purpose computer system, such as that shown in FIG. 5, that is specifically configured by software executed thereby to carry out the functions described above. Specifically, the computer system 100 shown in the figure includes a body part 101, which includes a CPU, a disc drive device and so forth, a display 102, which displays an image on a display portion 102*a* in accordance with instructions from the body part 101, a keyboard 103, which is used for inputting various information to the computer system 100, a mouse 104, which is used for specifying an arbitrary position on the display portion 102*a* of the display 102 and a modem 105, which is used for accessing an external data base 106. The above-described accounting-process-type setting program 4 and accounting-record outputting program 5, which are stored in a portable recording medium such as a disk 110 or are downloaded using the modem 105 from the external data base 106 are input to the computer system 100 and are executed.

The present invention is not limited to the above-described embodiments, and variations and modifications may be made without departing from the scope of the present invention claimed in the following claims.

What is claimed is:

1. An accounting-information outputting device comprising:

accounting-record-outputting condition setting means for setting an accounting-record-outputting condition for determining whether a process executed is a process for which an accounting record is to be output; and accounting-record outputting means for determining, when execution of the process by an execution unit is finished, whether said accounting-record outputting condition is fulfilled by the process, and, when said accounting-record-outputting condition is fulfilled by the process, outputting the accounting record for the process, so that when the accounting-record-outputting condition is not fulfilled for the process, the accounting record for the process will not be output.

2. The accounting-information outputting device, according to claim 1, wherein, based on the contents of an accounting-record-outputting condition definition file, said accounting-record-outputting condition setting means writes said accounting-record outputting condition in a predetermined area of a memory.

3. A computer-readable recording medium which stores therein an accounting-record outputting program which instructs a computer to set an accounting-record-outputting condition determining whether a process executed is a process for which an accounting record is to be output and determines, when execution of the process by an execution unit is finished, whether said accounting-record-outputting condition is fulfilled and, when said accounting-record-outputting condition is fulfilled by the process, instructs said computer to output the accounting record for the process so that when the accounting-record-outputting condition is not fulfilled for the process, the accounting record for the process will not be output.

4. A computer program product comprising a computer-usable medium having computer-readable program code means embodied in said medium, said computer-readable program code means comprising:

first program code means for instructing a computer to set an accounting record outputting condition for determining whether a process executed is a process for which an accounting record is to be output; and second program code means for instructing said computer to determine, when execution of the process by an execution unit is finished, whether said accounting-record outputting condition is fulfilled by the process and, when said accounting-record outputting condition is fulfilled by the process, for instructing said computer to output the accounting record for the process, so that when the accounting-record-outputting condition is not fulfilled for the process, the accounting record for the process will not be output.

5. The computer program product, according to claim 4, wherein, based on the contents of an accounting-record-outputting condition definition file, said first program code means instructs said computer to write said accounting-record outputting condition in a predetermined area of a memory.

6. A computer specially configured by executing program code stored on a computer-usable medium, said program code comprising:

first computer-readable program code means for instructing a computer to set an accounting-record outputting condition for determining whether a process executed is a process for which an accounting record is to be output; and second computer-readable program code means for instructing said computer to determine, when execution of the process by an execution unit is finished, whether said accounting-record outputting condition is fulfilled by the process and, when said accounting-record outputting condition is fulfilled by the process, for instructing said computer to output an accounting record for the process, so that when the accounting-record-outputting condition is not fulfilled for the process, the accounting record for the process will not be output.

7. The computer, according to claim 6, wherein, based on the contents of an accounting record-outputting condition definition file, said first computer-readable program code means instructs said computer to write said accounting-record outputting condition in a predetermined area of a memory.

8. A medium storing a program controlling the outputting of an accounting record by a computer, by presetting an accounting-record-outputting condition determining whether a process executed is a process for which an accounting record is to be output; and in response to the computer having finished executing the process, instructing the computer to output an accounting record for the process if the accounting-record-outputting condition is fulfilled for the process, so that when the accounting-record-outputting condition is not fulfilled for the process, the accounting record for the process will not be output.

9. The medium claim 8, wherein the computer has a CPU and a fee is charged in accordance with a CPU time used while executing the process.

10. A method of outputting accounting information comprising:

setting an output condition determining whether a process executed is a process for which an accounting record is to be output; and determining, when execution of the process by an execution unit is finished, whether the output condition is fulfilled by the process and, if the output condition is fulfilled by the process, outputting an accounting record for the process, so that when the accounting-record-outputting condition is not fulfilled for the process, the accounting record for the process will not be output.

11. The accounting-information outputting device claimed in claim 1, wherein a fee is charged for a specific user, of a plurality of users of a computer system having a CPU, in accordance with a CPU time used while executing the process for the specific user.

12. The computer-readable recording medium claimed in claim 3, wherein the computer has a CPU and a fee is charged for a specific user, of a plurality of users of the computer, in accordance with a CPU time used while executing the process for the specific user.

13. The computer program product claimed in claim 4, wherein the computer has a CPU and a fee is charged for a specific user, of a plurality of users of the computer, in accordance with a CPU time used while executing the process for the specific user.

14. The computer claimed in claim 6, wherein the computer has a CPU and a fee is charged for a specific user, of a plurality of users of the computer, in accordance with a CPU time used while executing the process for the specific user.

\* \* \* \* \*

UNITED STATES PATENT AND TRADEMARK OFFICE
CERTIFICATE OF CORRECTION

PATENT NO.    : 6,085,264
DATED         : July 4, 2000
INVENTOR(S)   : Shinichi Katoh It is certified that error appears in the above-identified patent and that said Letters Patent is hereby corrected as shown below:

Column 6,
Line 13, after "medium" insert --claimed in--.

Signed and Sealed this

Seventh Day of August, 2001

*Attest:*

NICHOLAS P. GODICI
*Attesting Officer*     *Acting Director of the United States Patent and Trademark Office*